March 8, 1938. I. R. ALLEN 2,110,542
HAND PLATE
Filed June 11, 1937
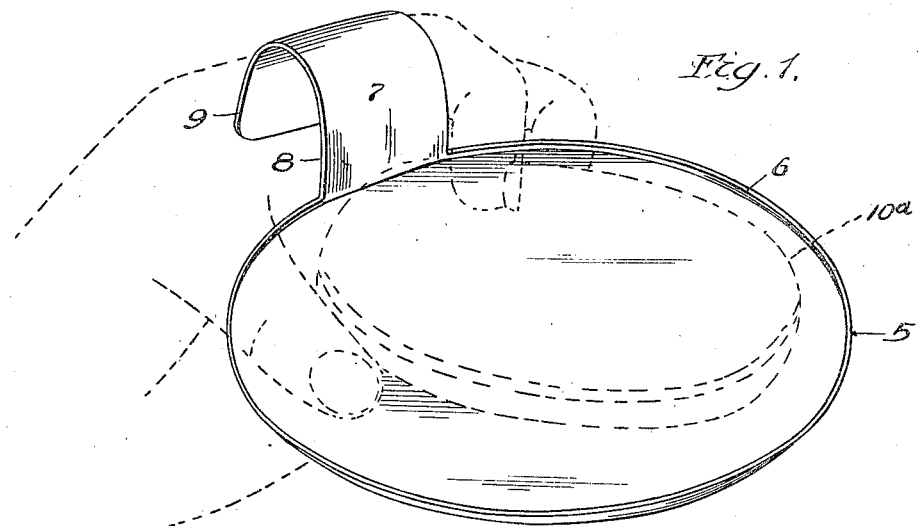
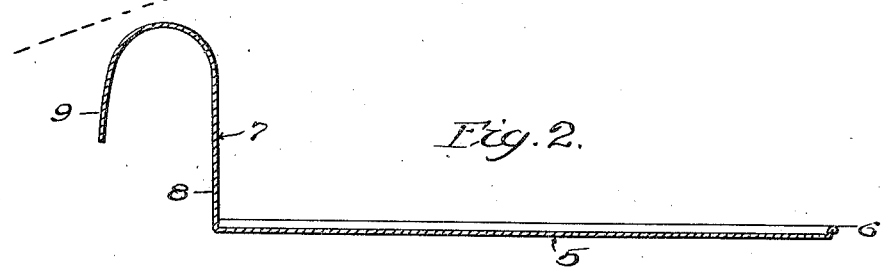
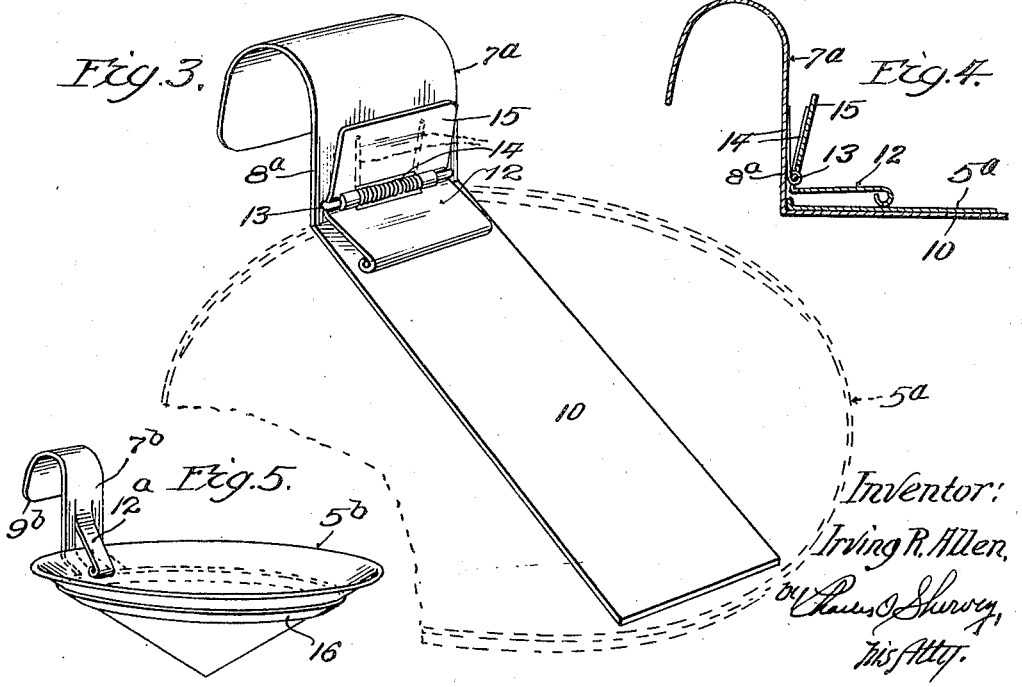
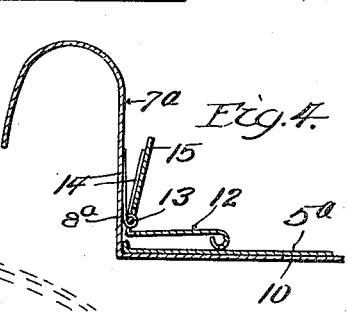
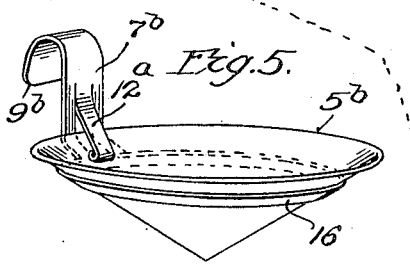
Inventor:
Irving R. Allen, Patented Mar. 8, 1938

2,110,542

UNITED STATES PATENT OFFICE 2,110,542

HAND PLATE

Irving R. Allen, near Wheaton, Ill.

Application June 11, 1937, Serial No. 147,732

5 Claims. (Cl. 65—61)

This invention relates to hand plates and its principal object is the provision of a device, by means of which a sandwich, "hot dog" or other edible commodity may be held between the thumb and fingers above a plate or other vessel whereby the edible commodity may be carried to the person's mouth and any crumbs or other droppings will be caught by the plate or vessel, thus leaving the person's other hand free to handle a cup or glass of beverage.

It is well known that many refreshment stands located along automobile roads and at other places are not equipped with tables for the accommodation of patrons, and also that automobile passengers, stopping at refeshment stands, enjoy remaining seated in the automobile while partaking of light refreshments. Unless some table or other support is provided in or upon the automobile, and the patron desires to eat a sandwish or other edible commodity and drink a cup or glass of liquid refreshment, he cannot very well, with one hand, hold a plate and eat a sandwich or other edible commodity therefrom and at the same time handle a cup or glass with the other hand.

In accordance with the present invention, the hand plate is provided with a holder whereby it may be supported upon a person's hand, leaving the thumb and fingers of the hand free to handle the edible commodity, whereby it may be eaten without spilling the crumbs, gravy or other droppings.

Another object is to provide a device having the above characteristics in which the plate or other vessel and holder therefor are separable whereby a used plate may be discarded and replaced by a new or clean one.

With these and other objects and advantages in view, this invention consists in a food supporting plate or other vessel, a holder whereby the vessel may be supported by one hand of the person, leaving the thumb and fingers thereof free to manipulate the food above the vessel. The invention further consists in a food holding device in which the holder and vessel are separable whereby a used vessel may be replaced by a clean one. The invention further consists in the several novel features hereinafter fully set forth and claimed.

The invention is clearly illustrated in the drawing accompanying this specification in which:

Fig. 1 is a perspective view of a hand plate containing a simple embodiment of the invention and showing in dotted lines a person's hand holding a "hot dog" upon the plate.

Fig. 2 is a central, vertical, longitudinal section through the device.

Fig. 3 is a perspective view of a modified form of the device and showing in dotted lines a plate fastened thereto.

Fig. 4 is a central, vertical, longitudinal, fragmental, section through the form of the device illustrated in Fig. 3.

Fig. 5 is a perspective view of a second modification of the invention.

Referring to said drawing and first to Figs. 1 and 2, the reference character 5 designates a plate, preferably round and composed of lightweight sheet metal, enamelware, cardboard, paper or the like. Desirably, the plate may be formed with a low upturned rim 6 to prevent crumbs, gravy or other droppings from falling off the plate.

Projecting up from the edge of the plate is a holder 7, here shown in the form of a hooked member, either separately formed and rigidly attached to the plate or formed integral therewith as desired, or the hook may be formed from a piece of resilient wire bent up into shape and fastened to the plate adjacent its marginal edge. The holder has a shank portion 8 which terminates in a hook 9 which is adapted to be placed upon the hand, as shown in Fig. 1, and serves to support the plate from the hand in a horizontal position, leaving the thumb and fingers free to manipulate a sandwich, "hot dog" or other edible commodity or food 10$^a$ carried by the plate. By grasping the food between the thumb and fingers, the food may be raised above the plate and carried to the person's mouth with the plate directly below the food whereby the plate serves to catch any crumbs, gravy or any droppings from the food and leaving the person's other hand free to handle a cup or glass of liquid refreshment.

In the form of the invention illustrated in Figs. 3 and 4, the plate illustrated in dotted lines at 5$^a$ may be formed separately from the holder 7$^a$ whereby a clean plate may be substituted for a used one. For the sake of economy, the plate may be made of cardboard, pasteboard or the like or it may be made of metal, enamelware, etc. The holder has a flat bar-like part 10 which projects from the shank 8$^a$ of the holder 7$^a$ and provides a support for the plate 5$^a$. On the shank 8$^a$ is a clip 12 which bears upon the upper face of the plate and holds the latter in place on the bar. The clip may be separately formed and pivotally mounted upon the holder by a pin 13 extending through ears on the clip with its ends secured in the shank 8$^a$. As shown, a coiled spring 14 surrounds the pin 13 and one end thereof bears against the shank 8ª and the other end bears against an upturned part 15 of the clip which forms a finger piece, by means of which the clip may be raised above the bar to permit a plate to be inserted under the clip. When released the spring serves to press the clip firmly against the plate, thereby clamping it upon the bar 10. This form of the device may be supported upon the hand of the person, permitting free use of fingers thereof to manipulate an edible commodity carried by the plate, and when used once, the plate may be removed and replaced by a clean one.

In the modified form illustrated in Fig. 5, a cone shaped paper vessel 5ᵇ may be used, and the holder 7ᵇ is provided with a ring 16 rigidly secured thereto and forms the support for the vessel. The upper end of the holder is formed with a hook member 9ᵇ as in the other forms whereby the device may be placed upon and supported by a person's hand. In this form of the invention the holder is provided with a spring clip 12ª desirably struck up from the metal of the holder and bent forward therefrom so that its lower end impinges upon the plate at a point opposite the ring 16, thereby firmly clamping the plate between the ring and clip. The material from which the holder is made is preferably resilient to give the necessary spring tension to the clip.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. A hand plate comprising a plate, a holder therefor having a plate rest upon which the plate is supported, said holder having also a hook member provided with a hook disposed on the side thereof opposite the plate, adapted to be placed upon a person's hand whereby to support the holder and plate from the hand, leaving the thumb and fingers free to manipulate food carried by the plate, and a spring clip carried by the holder and cooperating therewith to clamp the plate thereon.

2. A hand plate comprising a plate, and a holder, the latter comprising a bar-like part upon which the plate rests, and being provided with an upwardly extending hook member having a hook on its upper extremity disposed on the side thereof opposite the plate, adapted to be placed upon a person's hand, whereby to support the plate from the hand, leaving the thumb and fingers free to manipulate food carried by the plate, and a spring clip carried by the holder and arranged to hold the plate on said bar-like part.

3. A vessel and a holder therefor having a ring upon which the vessel is removably supported, said holder having also a shank projecting up from the ring and terminating in a hook member disposed on the side thereof opposite the vessel, adapted to be placed on a person's hand whereby the thumb and fingers are left free, and a clip on said shank arranged to engage the vessel at a point opposite the ring whereby to secure the vessel thereon.

4. A cone shaped vessel and a holder therefor having a ring upon which the vessel is removably supported, said holder having also a shank projecting up from the ring and terminating in a hook member disposed on the side thereof opposite the vessel, adapted to be placed on a person's hand whereby the thumb and fingers are left free, and a spring clip on said shank arranged to engage the vessel at a point opposite the ring, whereby to secure the vessel thereon.

5. A cone shaped vessel and a holder therefor having a ring upon which the vessel is removably supported, said holder having also a shank projecting up from the ring and terminating in a hook member disposed on the side thereof opposite the vessel, adapted to be placed on a person's hand whereby the thumb and fingers are left free, and a clip struck up from the material of the shank and arranged to engage the vessel at a point opposite the ring whereby to secure the vessel thereon.

IRVING R. ALLEN.